United States Patent
O'Brien

(10) Patent No.: US 8,216,455 B1
(45) Date of Patent: Jul. 10, 2012

(54) WATER HANDLING SYSTEM

(76) Inventor: Mackenzie Anne O'Brien, Dallas, TX (US)

(*) Notice: Subject to any disclaimer, the term of this patent is extended or adjusted under 35 U.S.C. 154(b) by 425 days.

(21) Appl. No.: 12/592,601

(22) Filed: Nov. 30, 2009

Related U.S. Application Data

(60) Provisional application No. 61/200,551, filed on Dec. 1, 2008.

(51) Int. Cl.
  *C02F 1/30* (2006.01)
  *C02F 1/32* (2006.01)
  *C02F 1/50* (2006.01)

(52) U.S. Cl. .......... 210/170.01; 210/170.09; 210/170.11; 210/192; 210/198.1; 210/251; 137/563; 137/565.01; 137/357; 137/236.1

(58) Field of Classification Search .................. None
See application file for complete search history.

(56) References Cited

U.S. PATENT DOCUMENTS

| | | | | |
|---|---|---|---|---|
| 1,993,923 A | | 3/1935 | Eccardt | |
| 3,175,578 A | * | 3/1965 | Patterson et al. | 137/561 A |
| 4,102,752 A | * | 7/1978 | Rugh, II | 376/317 |
| 4,162,218 A | * | 7/1979 | McCormick | 210/104 |
| 4,228,006 A | * | 10/1980 | Hanna | 210/167.3 |
| 4,871,452 A | * | 10/1989 | Kohler et al. | 210/167.3 |
| 5,192,426 A | | 3/1993 | De Coster | |
| 5,251,346 A | * | 10/1993 | Donati | 4/665 |
| 5,364,509 A | | 11/1994 | Dietrich | |
| 5,620,594 A | * | 4/1997 | Smith et al. | 210/167.3 |
| 6,030,535 A | * | 2/2000 | Hayashi et al. | 210/652 |
| 6,132,138 A | * | 10/2000 | Haese | 405/37 |
| 6,206,612 B1 | * | 3/2001 | Meyer | 405/36 |
| 6,317,898 B1 | * | 11/2001 | Mehta | 4/321 |
| 6,355,160 B1 | * | 3/2002 | Wiseman et al. | 210/90 |
| 6,627,089 B1 | * | 9/2003 | Wilkinson | 210/754 |
| 6,702,942 B1 | * | 3/2004 | Nield | 210/416.1 |
| 6,887,375 B2 | * | 5/2005 | Johnson | 210/170.03 |
| 7,875,180 B2 | * | 1/2011 | Fry et al. | 210/614 |
| 2002/0020010 A1 | * | 2/2002 | Mizutani | 4/487 |
| 2003/0228195 A1 | * | 12/2003 | Mizutani | 405/52 |
| 2004/0050429 A1 | * | 3/2004 | Aylward et al. | 137/597 |
| 2005/0045228 A1 | | 3/2005 | Labrodore | |
| 2010/0044206 A1 | * | 2/2010 | Shelley | 203/11 |
| 2011/0210049 A1 | * | 9/2011 | O'regan, Jr. | 210/85 |

OTHER PUBLICATIONS

Tang, S.L.: "Dual water supply in Hong Kong", Proceedings of the 26.sup.th WEDC Conference, 'Online! 2000, XP002331462, p. 364-366.*

* cited by examiner

*Primary Examiner* — Robert James Popovics

(57) ABSTRACT

A plurality of buildings each have a plurality of primary devices adapted to dispense potable water and a plurality of secondary devices adapted to dispense salt water. A primary feed line and branch feed lines convey the potable water to the primary devices. A secondary feed line and secondary branch feed lines convey the salt water to the secondary devices.

1 Claim, 2 Drawing Sheets

WATER HANDLING SYSTEM

RELATED APPLICATION

The present application is based upon Provisional Application Ser. No. 61/200,551 filed Dec. 1, 2008, the subject matter of which is incorporated herein by reference.

FIELD OF THE INVENTION

The present invention relates to a water handling system and more particularly pertains to providing communities with potable water for certain functional primary devices and treated salt water for other functional secondary devices, all in a sanitary, ecological, convenient and economical manner.

DESCRIPTION OF THE PRIOR ART

The use of water handlers is known in the prior art. More specifically, water handlers previously devised and utilized for the purpose of conveying and treating water are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 1,993,923 issued Mar. 12, 1935 to Eccardt relates to a Salt Water Shower. U.S. Pat. No. 5,192,426 issued Mar. 9, 1993 to DeCoster relates to a Water Reclamation System for Landscape Irrigation. U.S. Pat. No. 5,364,509 issued Nov. 15, 1994 to Dietrich relates to Wastewater Treatment. U.S. Pat. No. 5,845,346 issued Dec. 8, 1998 to Johnson relates to a water recycling System. Lastly, U.S. Patent Application Publication Number 2005/0045228, published Mar. 3, 2005 to Labrodore relates to Supplemental Water Supply for toilets, for Fire Fighting, and Strategies for Conservation of the Drinking Water.

While these devices fulfill their respective, particular objectives and requirements, the aforementioned patents do not describe water handling system that allows providing communities with potable water for certain functional primary devices and treated salt water for other functional secondary devices, all in a sanitary, ecological, convenient and economical manner.

In this respect, the water handling system according to the present invention substantially departs from the conventional concepts and designs of the prior art, and in doing so provides an apparatus primarily developed for the purpose of providing communities with potable water for certain functional primary devices and treated salt water for other functional secondary devices, all in a sanitary, ecological, convenient and economical manner.

Therefore, it can be appreciated that there exists a continuing need for a new and improved water handling system which can be used for providing communities with potable water for certain functional primary devices and treated salt water for other functional secondary devices, all in a sanitary, ecological, convenient and economical manner. In this regard, the present invention, as described herein, substantially fulfills this need.

SUMMARY OF THE INVENTION

In view of the foregoing disadvantages inherent in the known types of water handlers now present in the prior art, the present invention provides an improved water handling system. As such, the general purpose of the present invention, which will be described subsequently in greater detail, is to provide a new and improved water handling system and method which has all the advantages of the prior art and none of the disadvantages.

To attain this, the present invention essentially comprises a water handling system for providing communities with potable water for certain functional primary devices and treated salt water for other functional secondary devices, all in a sanitary, ecological, convenient and economical manner. The system comprises, in combination, a community with a plurality of buildings. Each of the buildings has a plurality of primary devices adapted to dispense potable water. The primary devices are chosen, for example, from the class of primary devices including kitchen/bathroom sinks, dishwashers and drinking fountains.

Each of the buildings has a plurality of secondary devices adapted to dispense treated salt water. The secondary devices chosen, for example, from the class of secondary devices including toilets, showers, baths and fire fighting devices.

A primary water treatment facility is operatively associated with the community. Such primary water treatment facility functions for converting non-potable water to the potable water.

Provided next is a primary water feed line assembly. Such assembly includes a primary feed line to convey the potable water from the water treatment facility to the community. Primary branch feed lines convey the potable water from the primary feed line to the primary devices in the plurality of buildings of the community.

A salt water treatment facility for creating treated salt water is provided next and includes a zone. Associated with the zone is an input line with a pump to feed untreated salt water from a natural salt water source to the zone. A biocidal/virucidal component at the zone functions to abate the harmful effects upon humans of the pathogenic microorganisms in the untreated salt water in the zone. The biocidal/virucidal component is chosen, for example, from the class of biocidal/virucidal components including ultraviolet radiation sources, infrared radiation sources, ozonators, chlorinators, dilutants and biocidal/virucidal chemicals.

A secondary water feed line assembly includes a secondary feed line functioning to convey the treated salt water from the zone to the community. Secondary branch feed lines convey the treated salt water from the secondary feed line to the secondary devices in the plurality of buildings.

Provided next are primary water drain lines. Such drain lines convey used potable water from the primary devices of each of the buildings to the primary water treatment facility.

Secondary water drain lines are also provided. Such drain lines convey used treated salt water from the secondary devices of each of the buildings to a natural source of salt water.

Lastly provided is a supplemental feed line for conveying treated salt water from the zone to supplemental communities for use in supplemental buildings.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved water handling system which has all of the advantages of the prior art water handlers and none of the disadvantages.

It is another object of the present invention to provide a new and improved water handling system which may be easily and efficiently manufactured and marketed.

It is a further object of the present invention to provide a new and improved water handling system which is of durable and reliable constructions.

An even further object of the present invention is to provide a new and improved water handling system which is susceptible of a low cost of manufacture with regard to both materials and labor, and which accordingly is then susceptible of low prices of sale to the consuming public, thereby making such water handling system economically available.

Even still another object of the present invention is to provide a water handling system for providing communities with potable water for certain functional primary devices and treated salt water for other functional secondary devices, all in a sanitary, ecological, convenient and economical manner.

Lastly, it is an object of the present invention to provide a new and improved water handling system. The water handling system comprises a plurality of buildings each having a plurality of primary devices adapted to dispense potable water and a plurality of secondary devices adapted to dispense salt water. A primary feed line and branch feed lines convey the potable water to the primary devices. A secondary feed line and secondary branch feed lines convey the salt water to the secondary devices.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated the preferred and primary embodiment and various alternate embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
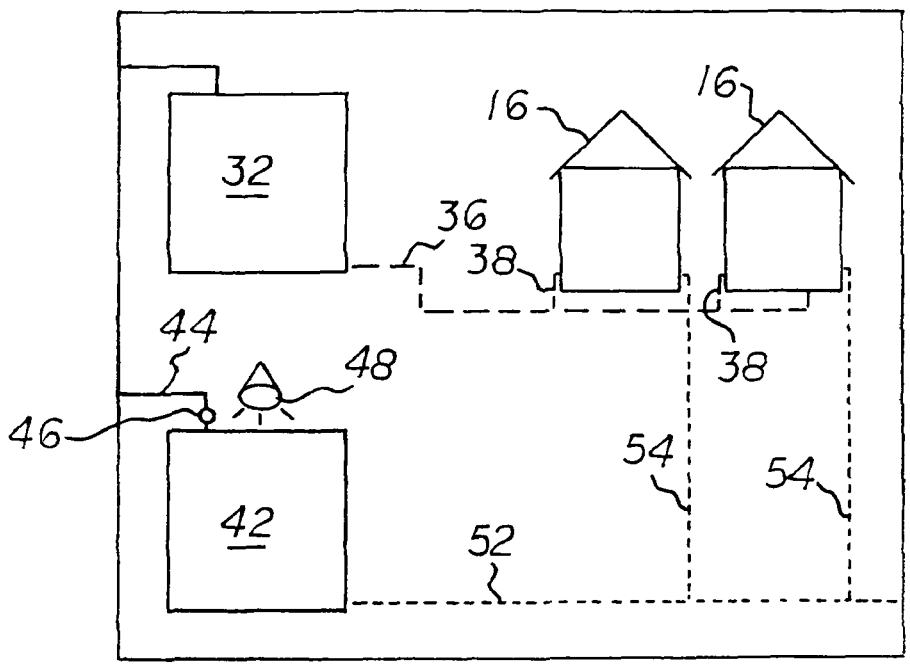
FIG. 1 is a schematic showing of a water handling system constructed in accordance with the principles of the present invention illustrating the water into the buildings.
Figure 2:
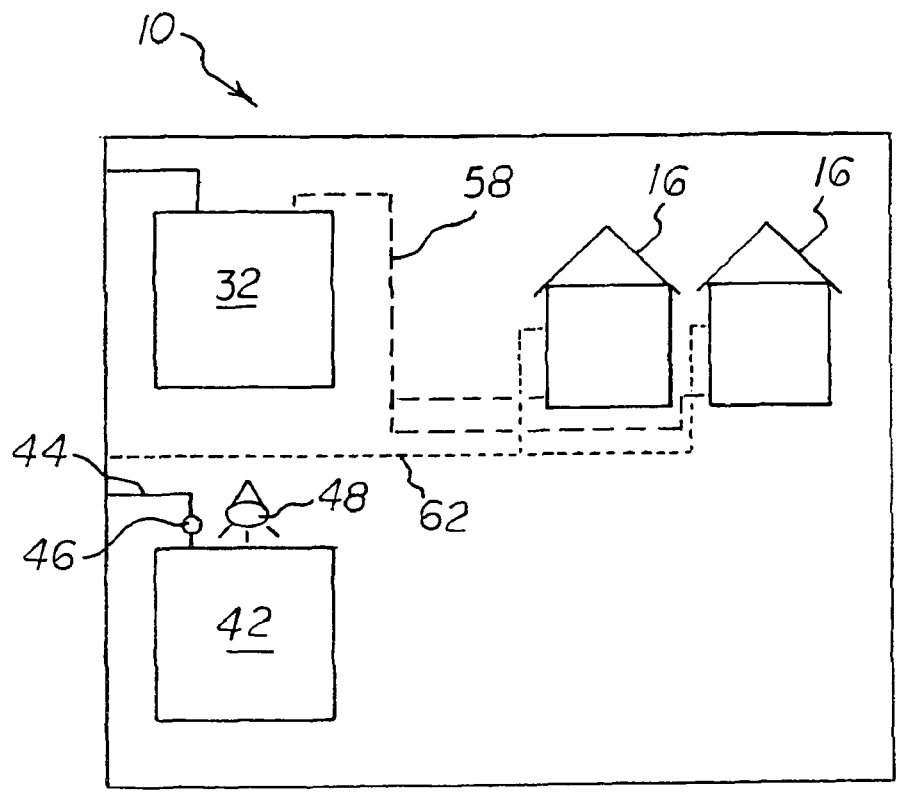
FIG. 2 is a schematic showing of a water handling system constructed in accordance with the principles of the present invention illustrating the water out of the buildings.
Figure 3:
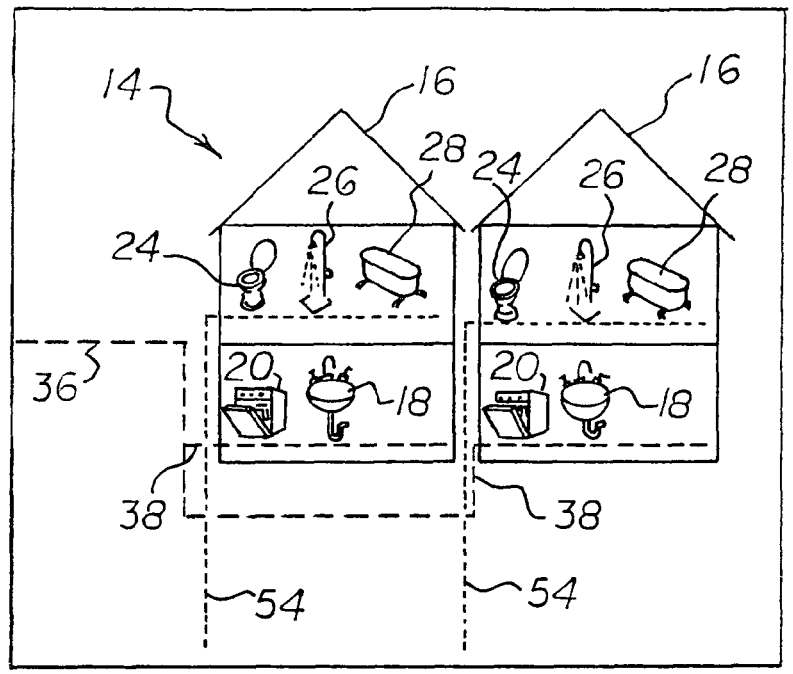
FIG. 3 is an enlarged plan view of two buildings of a community equipped with the system of the present invention illustrating the water into the buildings.
Figure 4:
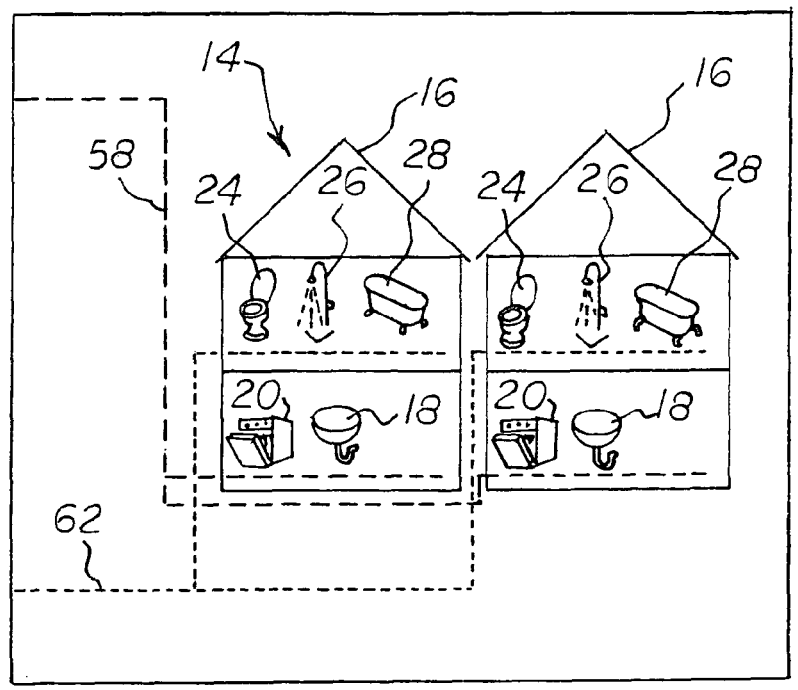
FIG. 4 is an enlarged plan view of two buildings of a community equipped with the system of the present invention illustrating the water out of the buildings.

With reference now to the drawings, and in particular to FIG. 1 thereof, the preferred embodiment of the new and improved water handling system embodying the principles and concepts of the present invention and generally designated by the reference numeral 10 will be described.

The present invention, the water handling system 10, is comprised of a plurality of components. Such components in their broadest context include a plurality of buildings, primary and secondary devices for dispensing water, a primary feed line for conveying potable water to the primary devices and a secondary feed line for conveying salt water to the secondary devices. Such components are individually configured and correlated with respect to each other so as to attain the desired objective.

The water handling system 10 functions for providing communities with potable water for certain functional primary devices and for providing treated salt water for other functional secondary devices. All is achieved in a sanitary, ecological, convenient and economical manner.

The system comprises, in combination, a community 14 with a plurality of buildings 16. Each of the buildings has a plurality of primary devices adapted to dispense potable water. The primary devices are chosen, for example, from the class of primary devices including kitchen/bathroom sinks 18, dishwashers 20 and drinking fountains.

Each of the buildings has a plurality of secondary devices adapted to dispense treated salt water. The secondary devices chosen, for example, from the class of secondary devices including toilets 24, showers 26, baths 28 and fire fighting devices.

A primary water treatment facility 32 is operatively associated with the community. Such primary water treatment facility functions for converting non-potable water to the potable water.

Provided next is a primary water feed line assembly. Such assembly includes a primary feed line 36 to convey the potable water from the water treatment facility to the community. Primary branch feed lines 38 convey the potable water from the primary feed line to the primary devices in the plurality of buildings of the community.

A salt water treatment facility for creating treated salt water is provided next and includes a zone 42. Associated with the zone is an input line 44 with a pump 46 to feed untreated salt water from a natural salt water source to the zone. A biocidal/virucidal component 48 at the zone functions to abate the harmful effects upon humans of the pathogenic microorganisms in the untreated salt water in the zone. The biocidal/virucidal component is chosen, for example, from the class of biocidal/virucidal components including ultraviolet radiation sources, infrared radiation sources, ozonators, chlorinators, dilutants and biocidal/virucidal chemicals.

The salt water treatment facility cleans the ocean water but does not take out the salt. The clean salt water may thus be used in showers, baths and toilets. This will help the environment because the potable water will not be wasted so it may be used in sinks, drinking fountains and dishwashers. Some examples of artificial sources of ultraviolet, UV, radiation include black lights, curing lamps, germicidal lamps, mercury vapor lamps, halogen lights, high-intensity discharge lamps, fluorescent and incandescent sources and some types of lasers. Solar water disinfection is a cheap and effective way to disinfect water. The water is put into plastic PET bottles and set in the sun for six hours. The sunlight kills germs that cause diarrhea. Some of the oxidizing agents used to kill bacteria are chlorine, chlorine dioxide, chloroisocyanurates, hypochlorite, ozone and chloramine. Some of the non-oxidizing agents are acrolein, amines, chlorinated phenolics, copper salts, organo-sulpher compounds, quaternary ammonium salts. Adding chlorine to water kills bacteria and viruses. Chlorine is also used in swimming pools and for sewage treatment. Chlorination is very useful, but it has some drawbacks. It can react with organic compounds which results in disinfection byproducts, DBPs. Rubbing alcohol dilutes water. A biocide is a chemical that kills living organisms. It is commonly used to clean water and can either be a pesticide or an antimicrobial.

A secondary water feed line assembly includes a secondary feed line 52 functioning to convey the treated salt water from the zone to the community. Secondary branch feed lines 54 convey the treated salt water from the secondary feed line to the secondary devices in the plurality of buildings.

Provided next are primary water drain lines 58. Such drain lines convey used potable water from the primary devices of each of the buildings to the primary water treatment facility.

Secondary water drain lines 62 are also provided. Such drain lines convey used treated salt water from the secondary devices of each of the buildings to a natural source of salt water.

Lastly provided is a supplemental feed line 66 for conveying treated salt water from the zone to supplemental communities for use in supplemental buildings.

The present invention is directed to extending potable water usage. The invention involves creating new water distribution systems to pipe ocean salt water into homes to be used in toilets, showers and baths. The salt water would first be treated in water treatment plants to remove the pathogenic organisms but not the salt. Then a secondary set of pipes, parallel to the potable water pipes, would be sent into homes. Homes would have a secondary set of pipes going to the toilets, showers and baths. It is estimated that this would save 60 percent of potable water use in homes.

The problem today is that many cities are running out of potable water because the population is increasing rapidly and many people waste water without thinking about it. The hydrologic cycle is very slow, meaning that fresh water is replaced slower than humans are using it. Water evaporates from the ocean, condenses, and precipitates onto the land and into water bodies like lakes. People use fresh water faster than the earth cycles it. Many people live in arid or semi-arid climates, without much rainfall to fill lakes, which supply potable drinking water. They still use a lot of water for bathing, watering lawns, and for many other uses. Some cities are projected to run out of water in the coming decades. Desalinating ocean water is very expensive, and also uses a lot of energy. Energy also should not be wasted. People should conserve water, but will not want to give up having a lawn or taking long showers.

The solution of the present invention takes water from the oceans and takes out all of the pathogenic organisms and just leaves the salt and water. Germs are removed, for example, with chlorine, ultra-violet light, or chloramine. The pathogenic organism removal steps will occur at the water treatment plants, the same places that fresh water is purified. Pathogens to be removed include viruses and bacteria. The water is adapted to be pumped to towers that are only for the saltwater. The towers provide a reservoir and pressure to send the ocean water to homes. Homes will be made with saltwater pipes next to the freshwater pipes. The saltwater pipes will travel to toilets and showerheads and baths. Homes will thus be made with two separate water distribution systems.

The average person uses about 110 gallons of water per day. As an example, if a person takes one ten minute shower it will use 50 gallons of water. If a toilet is flushed three times per day it uses another 15 gallons of water. This is 65 gallons of water per day for shower and toilet. The shower and toilet for an average person is about 60 percent of the total personal water use.

Many of the cities which are facing water shortages include Los Angeles, New York, Tampa, and Miami. These cities are near the ocean and could easily pipe in saltwater.

There is an extra benefit. The saltwater in baths is healthy for us. For thousands of years people have traveled to special baths or the ocean for its healing properties. We may now keep the purified potable water for drinking.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A water handling system for providing communities with potable water for certain functional primary devices and treated salt water for other functional secondary devices, the system comprising in combination:

a community having a plurality of buildings, each having a plurality of primary devices adapted to dispense potable water, the primary devices chosen from the class of primary devices including kitchen/bathroom sinks, dishwashers and drinking fountains, each of the buildings having a plurality of secondary devices adapted to dispense treated salt water, the secondary devices chosen from the class of secondary devices including toilets, showers, baths and fire fighting devices;

a primary water treatment facility operatively associated with the community for converting non-potable water to potable water;

a source of non-potable fresh water;

a primary water feed line assembly including a primary feed line to convey the potable water from the water treatment facility to the community with primary branch feed lines to convey the potable water from the primary feed line to the primary devices in the plurality of buildings of the community;

a natural source of untreated salt water;

a salt water treatment facility including a zone having an input line with a pump to feed untreated salt water from said natural salt water source to the zone, a biocidal/virucidal component at the zone to abate the harmful effects upon humans of the pathogenic microorganisms in the untreated salt water in the zone, the biocidal/virucidal component being chosen from the class of biocidal/virucidal components including ultraviolet radiation sources, infrared radiation sources, ozonators, chlorinators, dilutants and biocidal/virucidal chemicals, for creating treated salt water, wherein said water handling system does not remove salt from said salt water;

a secondary water feed line assembly including a secondary feed line to convey the treated salt water from the zone to the buildings with secondary branch feed lines to convey the treated salt water from the secondary feed line to the secondary devices in the plurality of buildings;

primary water drain lines for conveying used potable water from the primary devices of each of the buildings to the primary water treatment facility;

secondary water drain lines for conveying used treated salt water from the secondary devices of each of the buildings to the natural source of salt water; and a supplemental feed line for conveying treated salt water from the zone to supplemental buildings.

\* \* \* \* \*